US012634328B2

(12) United States Patent
da Silva et al.

(10) Patent No.: US 12,634,328 B2
(45) Date of Patent: May 19, 2026

(54) AUTOMATING MODEL INVERSION DEFENSE SELECTION FOR HETEROGENEOUS FEDERATED LEARNING

(71) Applicant: Dell Products L.P., Round Rock, TX (US)

(72) Inventors: Pablo Nascimento da Silva, Niterói (BR); Isabella Costa Maia, São Paulo (BR); Iam Palatnik de Sousa, Rio de Janeiro (BR); Eduarda Tatiane Caetano Chagas, Belo Horizonte (BR); Maira Beatriz Hernandez Moran, Rio de Janeiro (BR); Paulo Abelha Ferreira, Rio de Janeiro (BR)

(73) Assignee: Dell Products L.P., Round Rock, TX (US)

( * ) Notice: Subject to any disclaimer, the term of this patent is extended or adjusted under 35 U.S.C. 154(b) by 58 days.

(21) Appl. No.: 18/639,853

(22) Filed: Apr. 18, 2024

(65) Prior Publication Data

US 2025/0330483 A1      Oct. 23, 2025

(51) Int. Cl.
*H04L 9/40* (2022.01)
*G06N 3/045* (2023.01)
*G06N 3/098* (2023.01)

(52) U.S. Cl.
CPC ......... *H04L 63/1433* (2013.01); *G06N 3/045* (2023.01); *G06N 3/098* (2023.01)

(58) Field of Classification Search
CPC ........ G06N 3/098; G06N 20/00; G06N 3/045; G06N 3/084; G06F 17/18; G06F 21/554; G06F 21/577; H04L 63/205; H04L 63/1408; H04L 9/008
See application file for complete search history.

(56) References Cited

U.S. PATENT DOCUMENTS

| | | | |
|---|---|---|---|
| 12,400,031 B2 * | 8/2025 | Arora .................... | G06N 3/084 |
| 2020/0082097 A1 * | 3/2020 | Poliakov .............. | G06F 21/577 |
| 2021/0019399 A1 * | 1/2021 | Miller ................... | G06F 21/554 |
| 2021/0051169 A1 * | 2/2021 | Karame ................ | G06N 20/00 |
| 2021/0243204 A1 * | 8/2021 | Taylor ................. | H04L 63/1408 |
| 2021/0383280 A1 * | 12/2021 | Shaloudegi ............ | G06F 17/18 |
| 2023/0196121 A1 * | 6/2023 | Song ..................... | G06N 3/098 |
| | | | 706/25 |
| 2023/0229786 A1 * | 7/2023 | Eloul .................... | G06F 21/577 |
| 2023/0308465 A1 * | 9/2023 | Alroobaea ........... | H04L 63/205 |

(Continued)

OTHER PUBLICATIONS

Ligeng Zhu, Zhijian Liu, and Song Han. Deep leakage from gradients. In Advances in Neural Information Processing Systems, 2019.

(Continued)

*Primary Examiner* — Dustin Nguyen

(74) *Attorney, Agent, or Firm* — Workman Nydegger

(57) ABSTRACT

One example method includes allocating defense methods to nodes of a federation according to respective resources available at the nodes, testing the nodes by causing the defense methods to be run at the nodes, collecting defense method metadata concerning results of running the defense methods at the nodes, analyzing the defense method metadata, and based on the analyzing, allocating the defense methods across the nodes. The defense methods may be configured to defend against a model inversion attack.

14 Claims, 6 Drawing Sheets

(56) References Cited

U.S. PATENT DOCUMENTS

| | | | | |
|---|---|---|---|---|
| 2023/0370491 A1* | 11/2023 | Crabtree | ................. | G06N 3/098 |
| 2024/0144029 A1* | 5/2024 | Feng | ...................... | G06N 3/045 |
| 2024/0413969 A1* | 12/2024 | d'Aliberti | .............. | H04L 9/008 |
| 2025/0094571 A1* | 3/2025 | Taghia | .................. | G06F 21/554 |
| 2025/0245519 A1* | 7/2025 | Maia | ...................... | G06N 3/098 |

OTHER PUBLICATIONS

Jonas Geiping, Hartmut Bauermeister, Hannah Droge, and Michael Moeller. Inverting gradients—how easy is it to break privacy in federated learning? In Advances in Neural Information Processing Systems, 2020.

* cited by examiner $$\arg \min_{x \in [0,1]^n} 1 - \frac{\langle \nabla_\theta \mathcal{L}_\theta(x,y), \nabla_\theta \mathcal{L}_\theta(x^*,y) \rangle}{\|\nabla_\theta \mathcal{L}_\theta(x,y)\| \|\nabla_\theta \mathcal{L}_\theta(x^*,y)\|} + \alpha\, TV(x)$$

Problem ( I )

Where $\theta$ are the network parameters:

| | |
|---|---|
| $x$ | Reconstruction image |
| $x^*$ | Input image |
| $y$ | Image label |
| $\nabla_\theta \mathcal{L}_\theta(x,y)$ | Loss gradient of reconstructed image and image label w.r.t. model weights |
| $\nabla_\theta \mathcal{L}_\theta(x^*,y)$ | Loss gradient of input image and image label w.r.t. model weights |
| $TV(x)$ | Total variation function of reconstruction image |

FIG. 1

| Restriction | Constraint formula | Variables |
|---|---|---|
| Defense method requires GPU | $g_d(X) := X_{d,:} \bullet A = 0$ | Binary vector $A$ of size $N$ nodes, with 1 if node has GPU |
| Defense method requires sufficient battery | $g_d(X) := X_{d,:} \bullet B \geq \in$ | Vector $B$ of size $N$ nodes, with battery level |
| Defense method requires $K$ CPUs of a given type | $g_c(X) := X_{d,:} \bullet B \geq \tau$ | Vector $C$ of size $N$ nodes, with number of CPUs |

404

Defense
methods $$X = \begin{matrix} 1 & 0 \\ 0 & 1 \\ 1 & 1 \end{matrix}$$

Nodes

Constrained Optimization $X = R^{D \times N}$, allocation of $D$ defense methods to $N$ nodes $$f(X) = \frac{1}{N}\sum_{i=1}^{N} X_{i,:} + \frac{1}{D}\sum_{j=1}^{D} X_{:,j}$$

- The average number of defense methods allocated to each node
- The average number of nodes allocated to each defense method

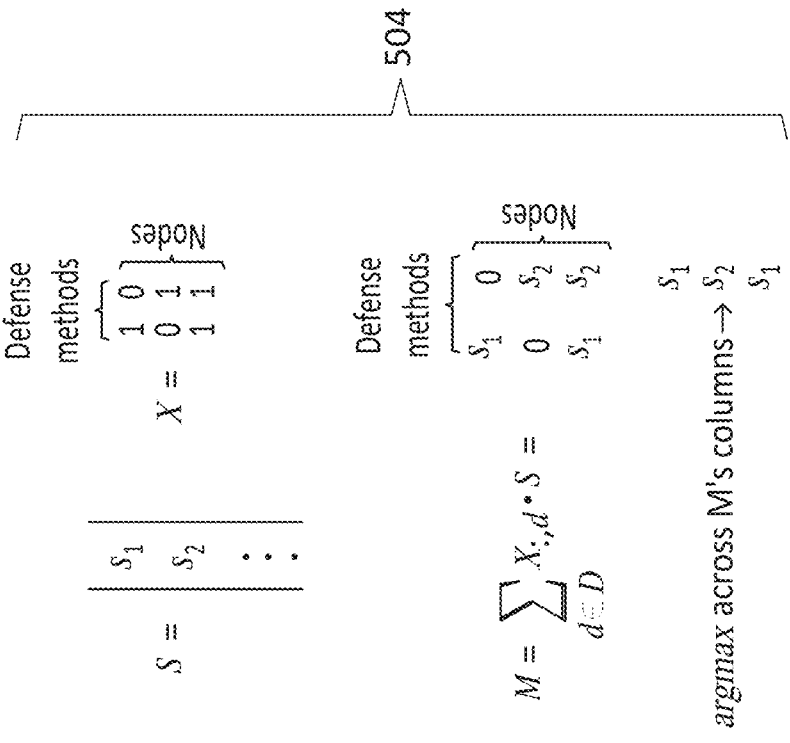

$$S = \begin{vmatrix} s_1 \\ s_2 \\ \vdots \end{vmatrix}$$

$$X = \begin{matrix} 1 & 0 \\ 0 & 1 \\ 1 & 1 \end{matrix} \left.\vphantom{\begin{matrix}1\\0\\1\end{matrix}}\right\} \text{Defense methods}$$

Nodes $$M = \sum_{d \in D} X_{:,d} \cdot S = \begin{matrix} s_1 & 0 \\ 0 & s_2 \\ s_1 & s_2 \end{matrix} \left.\vphantom{\begin{matrix}1\\0\\1\end{matrix}}\right\} \text{Defense methods}$$

Nodes $$\textit{argmax across M's columns} \rightarrow \begin{matrix} s_1 \\ s_2 \\ s_1 \end{matrix}$$

504

(a) Gather distribution of quality metrics per defense method (b) Compute best defense method per node according to resource allocation and best defense method

AUTOMATING MODEL INVERSION DEFENSE SELECTION FOR HETEROGENEOUS FEDERATED LEARNING

COPYRIGHT AND MASK WORK NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

TECHNOLOGICAL FIELD OF THE DISCLOSURE

Embodiments disclosed herein generally relate to defenses against attacks on the nodes of a federation. More particularly, at least some embodiments relate to systems, hardware, software, computer-readable media, and methods, for automatic selection and implementation of defenses in the nodes of a federated learning environment.

BACKGROUND

Federated Learning (FL) is a machine learning technique capable of providing model training from distributed devices while keeping their data private. Recent literature has been growing concerning attack methods that might be able to breach privacy in FL. One attack of particular concern is sometimes referred to as Model Inversion, where an adversary performs an isolation attack, for example, to intercept communication and obtain the model gradients of a node of the federation. Once in possession of the gradients, various adaptive methods can be employed by the attacker to create data that generates similar gradient responses from the model. The resulting generated data closely resembles the private training data, and, as such, may constitute a breach of privacy.

A related concern is that it is quite challenging to protect every node in a federation. Thus, there may be an increased likelihood that a given attack will prove to be successful.

BRIEF DESCRIPTION OF THE DRAWINGS

In order to describe the manner in which at least some of the advantages and features of one or more embodiments may be obtained, a more particular description of embodiments will be rendered by reference to specific embodiments thereof which are illustrated in the appended drawings. Understanding that these drawings depict only typical embodiments and are not therefore to be considered to be limiting of the scope of this disclosure, embodiments will be described and explained with additional specificity and detail through the use of the accompanying drawings.

FIG. 1 discloses aspects of a gradient similarity model inversion (MI) attack.

FIG. 4 discloses an overview of an example of node defense allocation optimization according to one embodiment.

FIG. 5 discloses aspects of an example defense method allocation according to one embodiment.

DETAILED DESCRIPTION OF SOME EXAMPLE EMBODIMENTS

Figure 2:
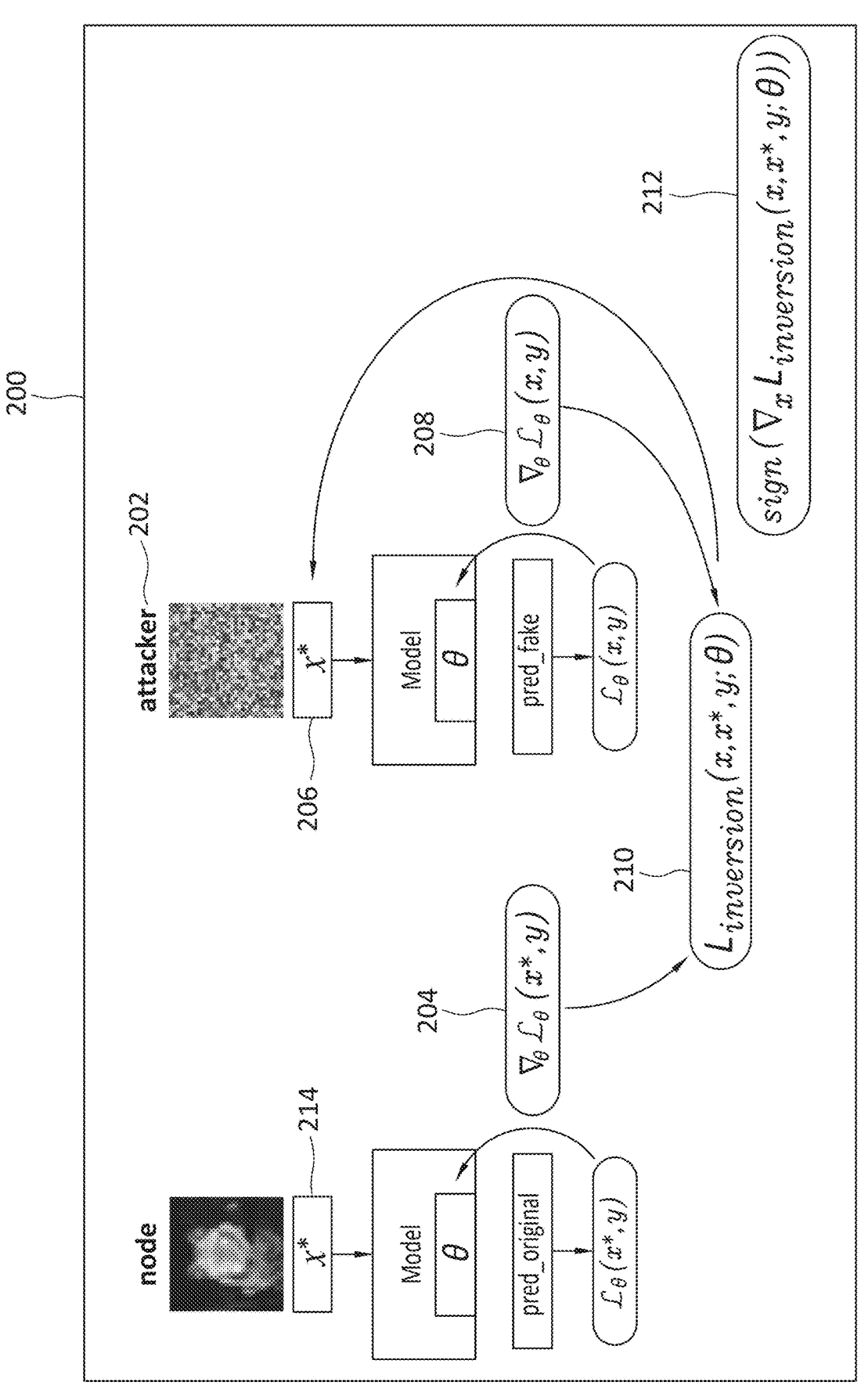
FIG. 2 discloses aspects of a process for a model inversion attack.

Embodiments disclosed herein generally relate to defenses against attacks on the nodes of a federation. More particularly, at least some embodiments relate to systems, hardware, software, computer-readable media, and methods, for automatic selection and implementation of defenses in the nodes of a federated learning environment.

One example embodiment comprises a method for automating model inversion defense selection for nodes of a heterogeneous federated learning environment. One embodiment of such a method comprises the operations: allocating defense tests to nodes of a federation according to respective resources available at the nodes; running the defense tests at the nodes; collecting defense test metadata, including quality metrics, concerning the results of running the defense tests at the nodes; analyzing the defense test metadata; and, based on the analyzing, allocating defense methods across the nodes.

Embodiments, such as the examples disclosed herein, may be beneficial in a variety of respects. For example, and as will be apparent from the present disclosure, one or more embodiments may provide one or more advantageous and unexpected effects, in any combination, some examples of which are set forth below. It should be noted that such effects are neither intended, nor should be construed, to limit the scope of the claims in any way. It should further be noted that nothing herein should be construed as constituting an essential or indispensable element of any embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment is that defenses against attacks may be automatically allocated to federation nodes based on the respective abilities of the nodes to carry out the defense. An embodiment may optimize defenses employed at a node based on quality metrics and resource availability at that particular node. Various other advantages of one or more example embodiments will be apparent from this disclosure.

A. Context for an Example Embodiment

The following is a discussion of aspects of one context for an embodiment. This discussion is not intended to limit the scope of the claims or this disclosure, or the applicability of the embodiments, in any way.

A.1 Federated Learning (FL)

Federated Learning (FL) is a machine learning technique where the goal is to train a centralized model while the training data remains distributed on many client nodes. Usually, the network connections and the processing power of such client nodes are unreliable and slow. The main idea is that client nodes can collaboratively learn a shared machine learning (ML) model, such as a deep neural network (DNN), while keeping the training data private on the client device, so the model can be learned without storing a huge amount of data in the cloud, or in a central node that communicates with the client nodes. Each of the client nodes in the federation receives an ML model from the central node and trains that ML model locally, sending only the gradient updates back to the central node. The central node may then perform the aggregation of updates and back propagate the aggregation to the global model, and then transmit the updated version of the model to each of the client nodes. This process is repeated iteratively until the global model reaches convergence. Any process with many data-generating nodes may benefit from such an approach.

It is noted that in the context of FL, a central node may be any machine with adequate computational power, and other resources, that receives the updates from the client nodes and aggregates these updates on the shared, or global, model. A client node is any device or machine, comprising hardware and/or software, that contains data that will be used to train the machine learning model. Examples of client nodes include, but are not limited to, connected cars, mobile phones, storage systems, and network routers.

A.2 Model Inversion Attack

One defense baseline against Model Inversion (MI) is referred to as Gradient Compression (GC) and operates by pruning node gradients that are below a threshold magnitude, such that only a part of local updates will be communicated from the nodes to a central node. Another, less common, pruning approach comprises randomly zeroing out a percentage of gradient values before sending the gradient to the server. Nevertheless, these approaches may present limited privacy guarantees, or may only provide model safety when jeopardizing the model convergence. That is, each of these approaches embodies a compromise.

As an example, and with reference now to FIG. 1, Gradient Similarity is currently one of the main Model Inversion attacks described in the literature and operates to minimize a cosine similarity cost function, Problem I, using the Adam optimizer. With attention now to FIG. 2 as well, that Figure discloses how such a Gradient Similarity attack, generally indicated at 200, is typically performed. Namely, an attacker 202 intercepts a node loss gradient $\nabla_\theta \mathcal{L}_\theta(x^*, y)$ 204 and tampers with it in an iterative process. By starting with a random noise image x 206, the attacker 202 obtains the corresponding reconstruction loss gradient $\nabla_\theta \mathcal{L}_\theta(x, y)$ 208 that will be used together with $\nabla_\theta \mathcal{L}_\theta(x, y)$ 204 to calculate the inversion loss $L_{inversion}(x, x^*, y; \theta)$ 210 associated with Problem I. The inversion gradient with respect to the reconstruction image, that is, $\nabla_x L_{inversion}(x, x^*, y; \theta)$ 212, is calculated and backwardly propagated to update x 206. This process is repeated until x 206 reveals information about the original input data x* 214 which, in case of an actual attack, might happen within about $n_{iterations}$=2000.

B. Overview of Aspects of an Example Embodiment

While it is very challenging to protect every node in a federation, one example embodiment operates to protect the most nodes with the best available defense method according to available resources at those nodes. That is, an embodiment may optimize the allocation of defenses to nodes in a federation.

In more detail, one embodiment comprises a method to provide an automatic approach for (1) protecting the most nodes with (2) the best available defense method against model inversion, in an FL scenario for example, and such method may comprise three elements, namely: (1) allocating defense tests to nodes according to their available resources—this may involve two operations, specifically, resource metadata collection, and defense allocation optimization; (2) defense test metadata collection—during and/or after defense methods are tested at each node, an embodiment may collect quality metrics over the defense methods and communicate those quality metrics back to a central node; and (3) defense method analysis and allocation—this may comprise performing an analysis on the defense test metadata to decide on an allocation of defense methods across nodes.

Thus, an example embodiment may comprise: (1) a resource-aware optimization method to allocate best suited defense methods according to available resources at each node; and/or (2) automatic analysis of defense quality across nodes to select the best (set of) defense method(s) for each node according to node parameters such as quality metrics and resource availability.

C. Detailed Discussion of Aspects of an Embodiment

Figure 3:
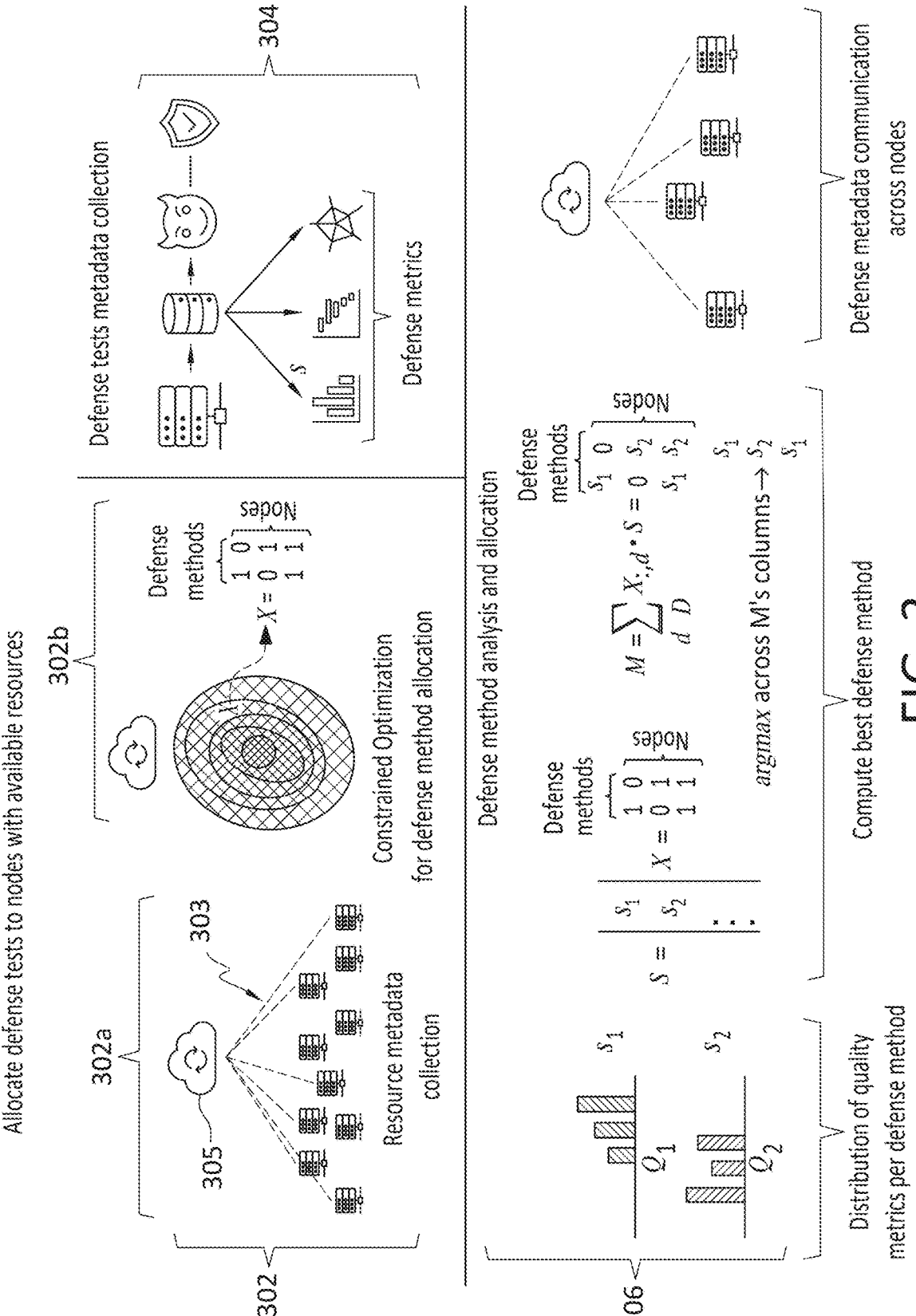
FIG. 3 discloses various phases of a method according to one embodiment.

With reference now to FIG. 3, an example method 300 according to one embodiment may comprise various phases. These phases may include a phase 302 for allocating defense tests to nodes according to resources available at those nodes The phase 302 may comprise two elements, namely, resource metadata collection 302a, and defense allocation optimization 302b. Another phase 304 of the example method 300 may comprise defense test metadata collection. A further phase 306 of the example method 300 may comprise defense method analysis and allocation. Each of these example phases is discussed in turn below.

C.1 Allocating Defense Methods to Available Nodes

C.1.1 Resource Metadata Collection

In an embodiment, the phase 302a comprise the selection of nodes 303, from the federation, that have spare computational resources, to work as a proxy to other nodes. An embodiment may assume that each node is capable of forecasting or reporting their resource usage, sharing this information with a central node 305 that may comprise a server.

A method according to one embodiment may collect node 303 participation metadata every K federation rounds, where the definition of K may consider resource availability in general, network bandwidth, among other constraints. When it is time to collect metadata from each node to determine participants, the central node 305 sends a signal to the nodes 303 for resource metadata collection, and each node 303 may then to prepare a file indicating their resource availability according also to resource type.

Examples of resources that may be considered in an embodiment include, but are not limited to, CPU (central processing unit) availability, GPU (graphics processing unit) availability, storage, and battery levels for far edge nodes, among others. The actual list of resources required in any given situation may be determined by the overall set of resources necessitated by the defense methods to be tested. In an embodiment, the central node 305 may then gather the resource metadata from each node 303 until a minimum number of sufficient nodes is reached for defense metadata collection. Thus, an embodiment may ensure coverage of running defense methods across as many nodes as possible. In an embodiment, each different defense method may have a minimum number/amount of resources needed to run effectively. From the nodes 303, an embodiment may then determine the resources available. The defense methods may then be allocated to nodes, which have sufficient resources to run the defense methods, to ensure the maximum number of nodes per defense method.

C.1.2 Defense Allocation Optimization

One example embodiment may employ a constrained optimization method, as at 302b, where the result is a set of defense methods allocated to each node. In one embodiment, an objective function of this constrained optimization method may, as shown at 302b, and at 400 in FIG. 4, comprise the sum of two functions 402, namely: (1) the average number of defense methods allocated to each node; and (2) the average number of nodes allocated to each defense method. That is, an embodiment may allocate as many defense methods to each node as possible, while also maintaining a good coverage of nodes that are running each defense method.

In an embodiment, the object $X \in R^{D \times N}$ over which optimization is performed may comprise a DxN matrix of allocation of D defense methods to N nodes. The constraints may be related to the resources available at each node and thereby limit the feasible allocations out of the possible allocations.

As an example, and with reference to the example constraints 404, consider a vector A of size N nodes, with 1 if that node has a GPU and 0 otherwise. Then, one constraint $g_d(X)$ for a given defense method d requiring a GPU could be $g_d(X): = X_{d,:} \cdot A = 0$. This constraint determines that a GPU-requiring defense method may be allocated to a node only if that node has a GPU as a resource. Another example constraint may be based on the required battery level for running a given defense method. In this case, consider a vector B of size N nodes, with a battery level from 0 to 1. Then, one constraint $g_d(X)$ for a given defense method d requiring sufficient battery could be $g_d(X): = X_{d,:} \cdot B \geq \epsilon$. This constraint thus provides that a given defense method may only be allocated to a node if that node has enough required battery to support execution of that defense method. These examples are illustrative cases of a more general framework, according to one embodiment, for optimizing allocation of defense methods to nodes. A domain specialist, such as a human, may devise various other constraints tailored to the specific federation where the training is taking place.

C.2 Defense Metadata Collection

With continued attention to the example of FIG. 3, once the resource optimization phase 302b is over, the server has a mapping of defense methods to be run at each available node. This phase 304 operates to gather feedback from each node on the performance of each evaluated defense method.

In more detail, and as indicated at 304, each participant node receives a set of defense methods to be tested. After training the model at each local node, when adequate resources are available, the local node will run one or more defense methods and collect relevant metrics from it. As an example, an embodiment may employ the gradient compression defense against Model Inversion, and gather a defense quality metric, such as the reconstruction error of the image. The association between each run defense method and its quality metric(s) may be stored as metadata and transmitted from the node(s) 303 back to the central node 305. In an embodiment, there is a possibility that the availability of resources in each node may change, and/or the possibility that a particular defense method may fail to finish running at one or more nodes 303. In that case, an embodiment may store this information as metadata prior to transmission to the central node.

C.3 Defense Method Allocation

Once the defense metadata collection phase 304 is over, the central server will have information on all participant nodes regarding the quality metrics for each run defense method. Thus, the next phase 306 is concerned with performing an analysis on these metadata to decide on an allocation of defense methods across the federation.

In the phase 306, initially, an analysis may be performed of each defense method across all nodes. With reference now to FIG. 5 as well, this results in the gathering 502 of a distribution over the quality metric across all nodes for a given defense method. Finally, an embodiment may then analyze 504 the distributions of quality metrics per defense method. According to a pre-defined threshold, an embodiment may choose which is the best defense method per node. This information is communicated from the central node 305 back to the nodes 303 and becomes the defense method to be used until the next round of defense analysis.

C.4 Further Discussion

As will be apparent from this disclosure, an embodiment may comprise one or more useful features and aspects, although no embodiment is required to possess any of such features or aspects. The following examples are illustrative.

An embodiment may define and employ a framework for robustness against Model Inversion attack in resource-heterogeneous Federated Learning scenarios. In an embodiment, such a framework may comprise a resource-aware optimization method to allocate best suited defense methods according to available resources at each node. In an embodiment, such a framework may comprise an automatic analysis of defense quality across nodes to select the best (set of) defense method(s) for each node according to quality metrics and resource availability.

D. Example Methods

It is noted that any operation(s) of any of the methods disclosed herein, may be performed in response to, as a result of, and/or based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

A method according to one embodiment may be performed in whole or in part at a central node operating in a federated environment that includes a group of clients nodes configured to communicate with the central node. In an embodiment, the running of defense methods may be performed at the nodes of a federated environment. In an embodiment, a method may be cooperatively performed by the nodes, and a central node, of a federated environment.

E. Further Example Embodiments

Following are some further example embodiments. These are presented only by way of example and are not intended to limit the scope of this disclosure or the claims in any way.

Embodiment 1. A method, comprising: allocating defense methods to nodes of a federation according to respective resources available at the nodes; testing the nodes by causing the defense methods to be run at the nodes; collecting defense method metadata concerning results of running the defense methods at the nodes; analyzing the defense method metadata; and based on the analyzing, allocating the defense methods across the nodes.

Embodiment 2. The method as recited in any preceding embodiment, wherein the defense method metadata comprises a quality metric that indicates how well the defense methods performed at the nodes with respect to a defined attack.

Embodiment 3. The method as recited in any preceding embodiment, wherein the allocating of the defense methods to the nodes comprises: resource metadata collection; and defense allocation optimization.

Embodiment 4. The method as recited in any preceding embodiment, wherein the defense methods are only allocated to the nodes that have adequate resources available to run the defense methods.

Embodiment 5. The method as recited in any preceding embodiment, wherein the defense methods are configured to defend the nodes against a model inversion attack.

Embodiment 6. The method as recited in any preceding embodiment, wherein the analyzing comprises using a constrained optimization method to determine which of the defense methods should be allocated to which of the nodes.

Embodiment 7. The method as recited in any preceding embodiment, wherein the analyzing comprises applying, to the defense metadata, a constrained optimization method comprising an objective function that comprises a sum of two functions, wherein the two functions are (1) an average number of the defense methods allocated to each node, and (2) an average number of the nodes allocated to each of the defense methods.

Embodiment 8. The method as recited in any preceding embodiment, wherein the analyzing of the defense metadata is performed automatically.

Embodiment 9. The method as recited in any preceding embodiment, wherein the federation is an element of a heterogeneous federated learning environment.

Embodiment 10. The method as recited in any preceding embodiment, wherein, given one or more constraints, best ones of the defense methods are allocated across most of the nodes.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of this disclosure also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality. Combinations of the above should also be included within the scope of computer storage media. Such media are also examples of non-transitory storage media, and non-transitory storage media also embraces cloud-based storage systems and structures, although the scope of this disclosure is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments may be downloadable to one or more systems or devices, for example, from a website, mesh topology, or other source. As well, the scope of this disclosure embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, client, agent, service, engine, or the like may refer to software objects or routines that execute on the computing system. These may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments may be performed in client-server environments, whether network or local environments, or in any other suitable environment. Suitable operating environments for at least some embodiments include cloud computing environments where one or more of a client, server, or other machine may reside and operate in a cloud environment.

Figure 6:
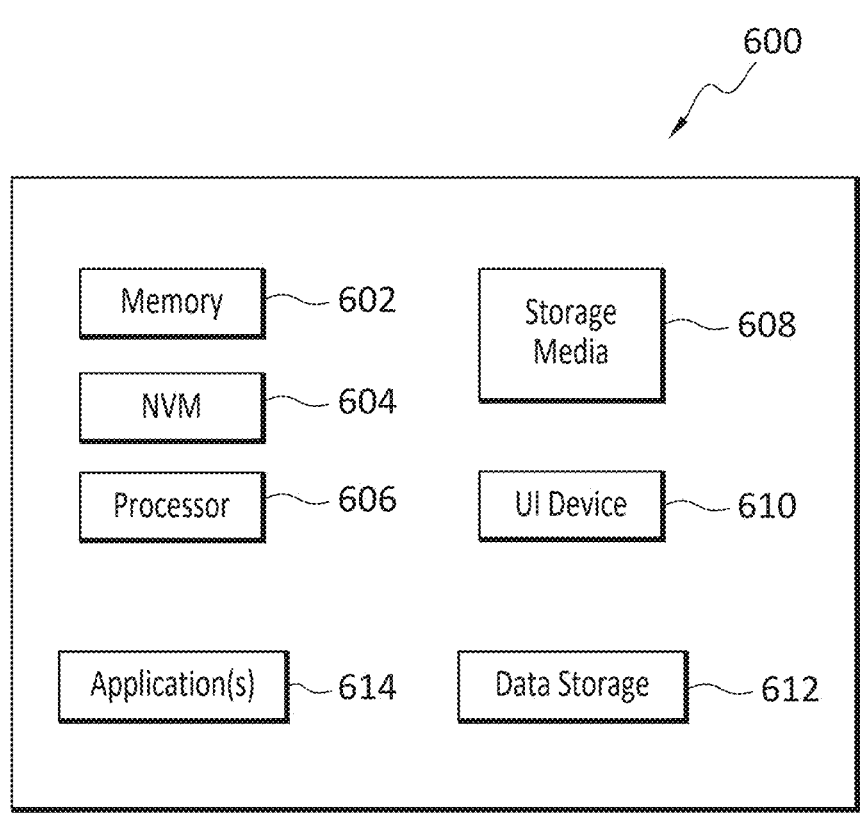
FIG. 6 discloses aspects of a computing entity configured and operable to perform any of the disclosed methods, processes, and operations.

With reference briefly now to FIG. 6, any one or more of the entities disclosed, or implied, by FIGS. 1-5, and/or elsewhere herein, may take the form of, or include, or be implemented on, or hosted by, a physical computing device, one example of which is denoted at 600. As well, where any of the aforementioned elements comprise or consist of a virtual machine (VM), that VM may constitute a virtualization of any combination of the physical components disclosed in FIG. 6.

In the example of FIG. 6, the physical computing device 600 includes a memory 602 which may include one, some, or all, of random access memory (RAM), non-volatile memory (NVM) 604 such as NVRAM for example, read-only memory (ROM), and persistent memory, one or more hardware processors 606, non-transitory storage media 608, UI device 610, and data storage 612. One or more of the memory components 602 of the physical computing device 600 may take the form of solid state device (SSD) storage. As well, one or more applications 614 may be provided that comprise instructions executable by one or more hardware processors 606 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The described embodiments are to be considered in all respects only as illustrative and not restrictive. All changes which come within the meaning and range of equivalency of the claims are to be embraced within their scope.

What is claimed is:

1. A method, comprising:
allocating defense methods, concerning a model inversion attack, to nodes of a federation according to respective resources available at the nodes, and the allocating comprises:
    collecting node resource metadata, for each of the nodes, for K federation rounds until a minimum number of nodes is reached for defense method metadata collection;
    based on the node resource metadata, performing a constrained resource optimization method that identifies a respective set of defense methods for allocation to each of the nodes, and one of the defense methods is a gradient compression defense;
    providing a respective one of the sets of defense methods to each of the nodes;
testing the nodes by causing the respective sets of defense methods to be run at the nodes with respect to respective instances of a model running at the nodes;
collecting defense method metadata concerning results of running the defense methods at the nodes;
analyzing the defense method metadata; and based on the analyzing, allocating the defense methods across the nodes.

2. The method as recited in claim 1, wherein the defense method metadata comprises a quality metric that indicates how well the defense methods performed at the nodes with respect to the model inversion attack.

3. The method as recited in claim 1, wherein the defense methods are only allocated to the nodes that have adequate resources available to run the defense methods.

4. The method as recited in claim 1, wherein the analyzing comprises applying, to the defense method metadata, a constrained optimization method comprising an objective function that comprises a sum of two functions, wherein the two functions are (1) an average number of the defense methods allocated to each node, and (2) an average number of the nodes allocated to each of the defense methods.

5. The method as recited in claim 1, wherein the analyzing of the defense method metadata is performed automatically.

6. The method as recited in claim 1, wherein the federation is an element of a heterogeneous federated learning environment.

7. The method as recited in claim 1, wherein, given one or more constraints, best ones of the defense methods are allocated across most of the nodes.

8. A non-transitory storage medium having stored therein instructions that are executable by one or more hardware processors to perform operations comprising:
allocating defense methods, concerning a model inversion attack, to nodes of a federation according to respective resources available at the nodes, and the allocating comprises:
    collecting node resource metadata, for each of the nodes, for K federation rounds until a minimum number of nodes is reached for defense method metadata collection;
    based on the node resource metadata, performing a constrained resource optimization method that identifies a respective set of defense methods for allocation to each of the nodes, and one of the defense methods is a gradient compression defense;
    providing a respective one of the sets of defense methods to each of the nodes;
testing the nodes by causing the respective sets of defense methods to be run at the nodes with respect to respective instances of a model running at the nodes;
collecting defense method metadata concerning results of running the defense methods at the nodes;
analyzing the defense method metadata; and
based on the analyzing, allocating the defense methods across the nodes.

9. The non-transitory storage medium as recited in claim 8, wherein the defense method metadata comprises a quality metric that indicates how well the defense methods performed at the nodes with respect to the model inversion attack.

10. The non-transitory storage medium as recited in claim 8, wherein the defense methods are only allocated to the nodes that have adequate resources available to run the defense methods.

11. The non-transitory storage medium as recited in claim 8, wherein the analyzing comprises applying, to the defense method metadata, a constrained optimization method comprising an objective function that comprises a sum of two functions, wherein the two functions are (1) an average number of the defense methods allocated to each node, and (2) an average number of the nodes allocated to each of the defense methods.

12. The non-transitory storage medium as recited in claim 8, wherein the analyzing of the defense method metadata is performed automatically.

13. The non-transitory storage medium as recited in claim 8, wherein the federation is an element of a heterogeneous federated learning environment.

14. The non-transitory storage medium as recited in claim 8, wherein, given one or more constraints, best ones of the defense methods are allocated across most of the nodes.

\* \* \* \* \*